United States Patent [19]

Jung

[11] Patent Number: 4,627,410
[45] Date of Patent: Dec. 9, 1986

[54] BARBECUE GRILL

[76] Inventor: Kwan S. Jung, 54-18, 1-Ka, Myong Dong Chung-Ku, Seoul, Rep. of Korea

[21] Appl. No.: 651,861

[22] Filed: Sep. 18, 1984

[30] Foreign Application Priority Data

May 31, 1984 [KR] Rep. of Korea ............... 84-5282[U]

[51] Int. Cl.⁴ .................. A47J 37/00; A47J 37/04
[52] U.S. Cl. .................. 126/25 A; 126/19 R; 126/41 R; 126/41 B; 126/41 D; 99/339; 99/390; 99/421 H
[58] Field of Search ............... 126/19 R, 41 R, 41 A, 126/41 B, 41 C, 41 D, 41 E, 25 A, 25 R, 19 M; 99/421 H, 390

[56] References Cited

U.S. PATENT DOCUMENTS

| | | | |
|---|---|---|---|
| 1,656,181 | 1/1928 | Elbert | 99/390 X |
| 2,335,217 | 11/1943 | Tate | 99/421 H X |
| 2,593,233 | 4/1952 | White | 126/41 E |
| 2,821,127 | 1/1958 | Hess | 126/41 D X |
| 3,010,384 | 11/1961 | Lingelbach | 99/390 |
| 3,742,838 | 7/1973 | Luschen et al. | 99/421 H |
| 4,089,258 | 5/1978 | Berger | 126/39 J X |
| 4,108,055 | 8/1978 | Simmons | 99/421 H |
| 4,120,237 | 10/1978 | Mecherlen | 99/390 X |

Primary Examiner—Larry Jones
Attorney, Agent, or Firm—Birch, Stewart, Kolasch & Birch

[57] ABSTRACT

A cooking oven which comprises a pair of opposing end walls, a pair of opposing side walls, the side walls disposed inside of the end walls and defining, together with the end walls, a cooking chamber, a supporting frame adapted to support the end walls and the side walls an, opposing slider member mounted for movement on the supporting frame, the side walls being operatively mounted on the slider member, and a moving member the slider member containing the side walls mounted thereon towards or away from each other, whereby the size of the cooking chamber can be varied depending on the size of the food to be cooked.

13 Claims, 4 Drawing Figures

4,627,410

BARBECUE GRILL

BACKGROUND AND SUMMARY OF THE INVENTION

The present invention relates to a barbecue grill with an infrared heater for use in a kitchen, a restaurant, an outdoor restaurant or park, and more particularly, to a barbecue cooker having an oven cavity which can be adjusted for cooking a pig, a cow, a chicken, a sheep or fish in its entirety.

Barbecue grills are known which utilize a fixed oven cavity in combination with a crossing rod which extends over the charcoal fire or over the electric wire heater. However, none of the prior art grills provide a cooker which has an adjustable oven space, and can be assembled and used both indoor and outdoor.

OBJECTS AND SUMMARY OF THE INVENTION

Accordingly, it is an object of the present invention to provide an improved barbecue grill.

Another object of the present invention is to provide a barbecue grill in which the size of the cooking chamber and the positions of the heating means can be adjusted depending on the size of the meat to be roasted.

Still another object of the present invention is to provide a cooker which can be assembled very easily and simply.

A further object of the present invention is to provide a barbecue grill with an infrared heater which can be used both indoor or outdoor.

Other objects and further scope of applicability of the present invention will become apparent from the detailed description given hereinafter. It should be understood, however, that the detailed description and specific examples while indicating preferred embodiments of the invention, are given by way of illustration only, since various changes and modifications within the spirit and scope of the invention will become apparent to those skilled in the art from this detailed description.

The present invention comprises a barbecue grill which can be used for cooking a cow, pig, sheep, chicken, fish or the like which can be readily assembled with an adjustable oven space, can be used both indoor or outdoor and has an infrared gas heating source.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
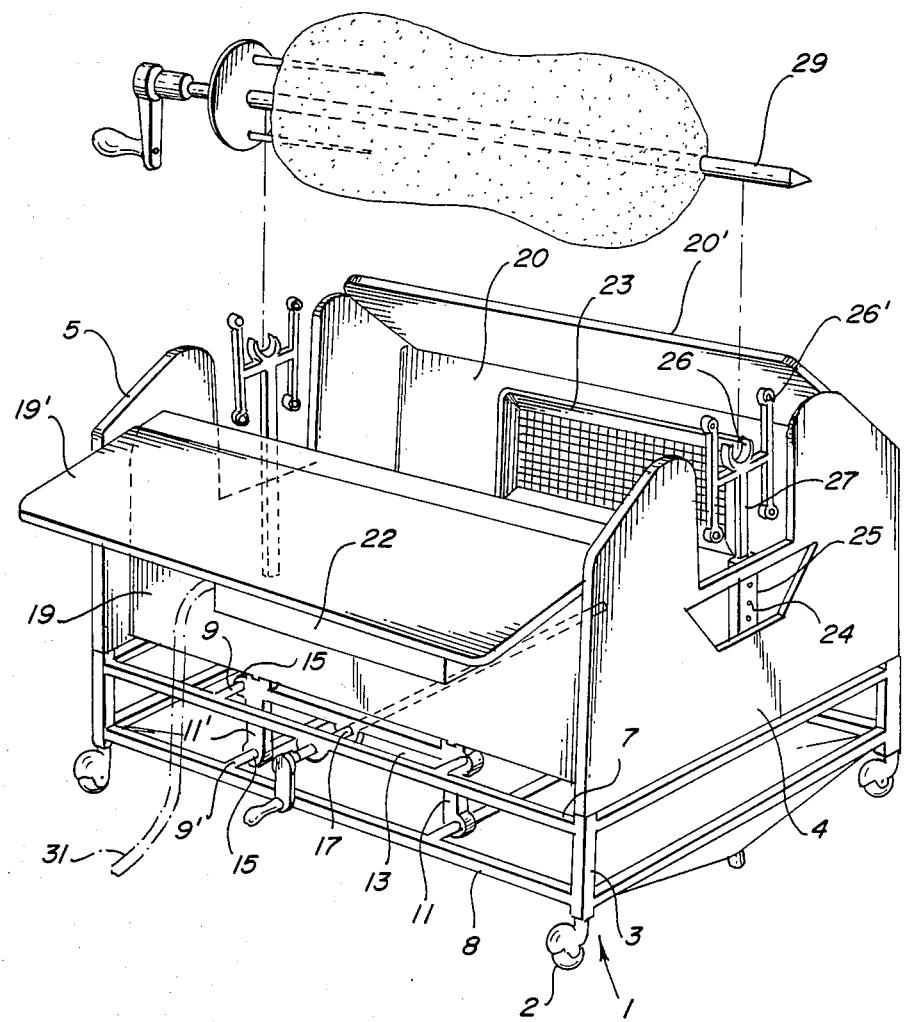
FIG 1. is a front perspective view of the barbecue grill of the present invention showing a cross hanger upon which the food is mounted.

Referring now in detail to the drawings for the purpose of illustrating the present invention, the barbecue grill as shown in FIGS. 1, 2, 3 and 4 comprises a supporting frame 1, a slider 13, a screw handle 17, an infrared heater 22, a meat supporter 27 and a cross hanger 29.

The supporting frame 1 has four wheels and four corner pipe sockets at each corner into which is inserted the legs 6, 6' of the side shaft plates 4 and 5, respectively.

An upper supporter 7 and a lower supporter 8 of the supporting frame 1 are provided with a pair of upper and lower connecting rods 9 and 10 having the sliders 13 and 14 containing pipe sockets 11, 11' at both sides of said rods 9 and 10.

The sliders 13 and 14 are provided with holes 15, 15' for adhering to the upper and lower connecting rods 9 and 10.

Screw handles 17 and 18 pass through the upper supporter 7 as well as through both sliders 13 and 14. These screw handles have the function of moving both sliders 13 and 14 from the front to the rear through the rotation of said handles. By rotating the screw handles the volume of the oven space can be varied. Accordingly, the size of the cooking chamber and the positions of the heating means can be varied depending on the size of the food to be cooked.

Legs 21, 21' of the front and rear plates 19 and 20 are disposed in the pipe sockets 11, 11' of sliders 13 and 14.

The infrared gas heaters are located at the center of the front and rear plates 19 and 20 and face each other. It is apparent that any type of heaters can be used in the device of the present invention.

Figure 4:
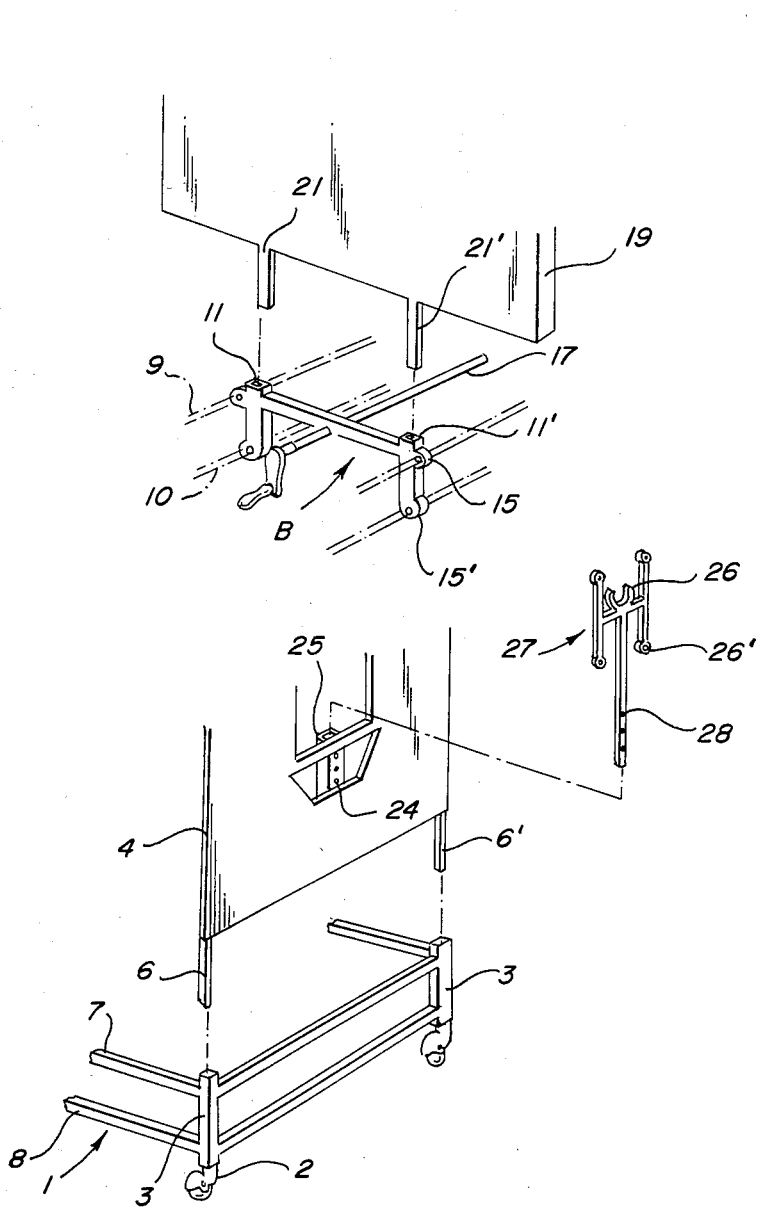
FIG. 4 is an exploded view showing the basic components for assembling the oven of the present invention.

The side shaft plates 4 and 5 each have adjusting pipes 25, 25' which are formed with a plurality of supporting holes 24 and 28 to adjust the height of the cross handle 27 for cooking. Supporters 27, 27' have small or large food support holders 26, 26' disposed in holes 24 and 28 for supporting the cross hanger 29, as shown in FIG. 4.

Slope reflectors 30, 30' are disposed to face the gas heaters 22 and 23 to reflect the heat.

All the gas for the heater passes through a pipe 31 and any user can put a steel wire net 32 on the supporter 27.

Figure 2:
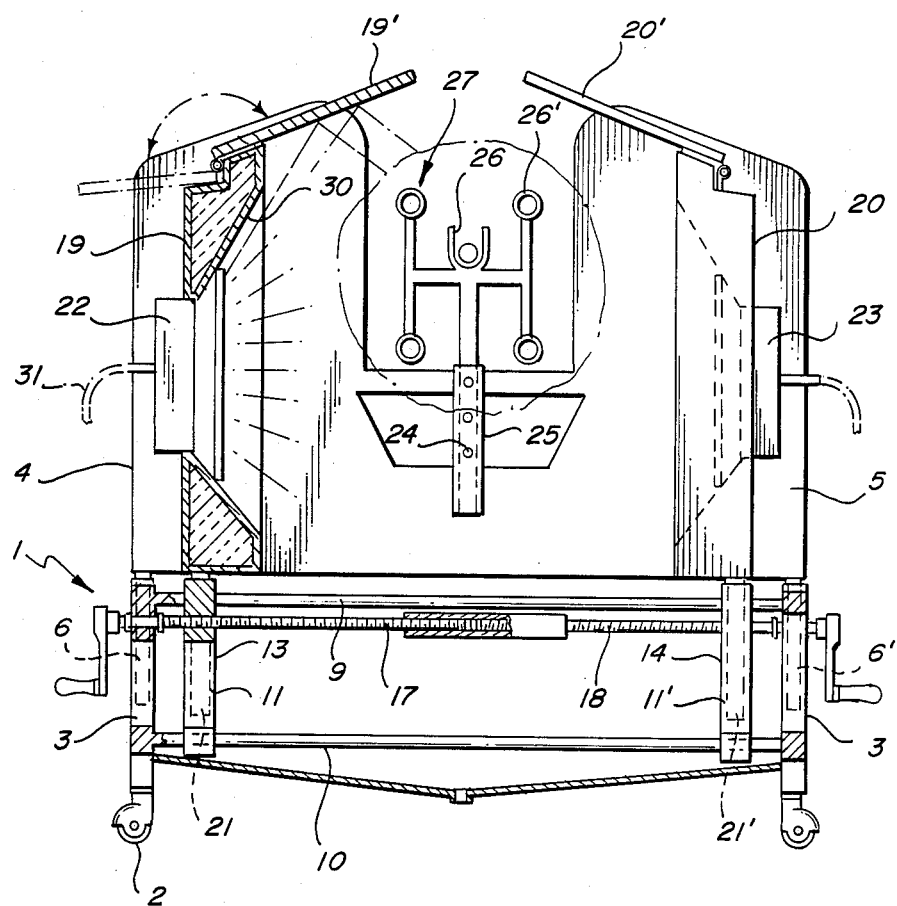
FIG. 2 is a side sectional view of a large oven as defined by the present invention.

As shown in FIG. 2, the front and rear plates 19 and 20 are moved from the front and the rear by rotating the screw handles 17 and 18 so that if a user wants to cook a large volume of meat such as cow, pig or sheep, the volume of the cooker can be enlarged accordingly.

Figure 3:
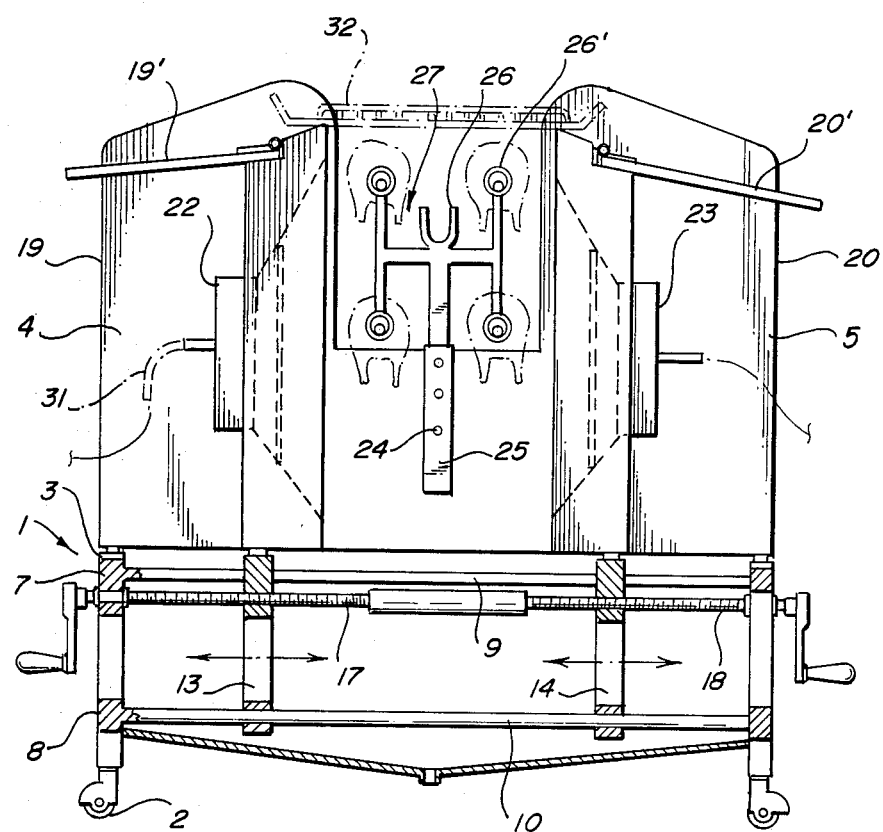
FIG. 3 is a side sectional view of a small oven as defined by the present invention.

Alternatively, in order to cook a small volume of meat such as a chicken or fish, the user can rotate the screw handles 17 and 18 in the opposite direction to move the front and rear plates 19 and 20 as shown in FIG. 3.

When the oven space is small as shown in FIG. 3, a user puts the steel wire net 32 on said gas heaters 22, 22' to roast the meat or puts a pan on it to cook it.

It is very easy for any user such as a young person to properly cook food, because of the slope reflectors 30, 30' the use of front and rear folding plates 19 and 20 to reflect the heat, and the use of supporters 27, 27' to control the height of the cross hanger 29 which holds the meat for cooking.

Also, it is very convenient to handy-carry the barbecue grill of the present invention and move it from outdoor to indoor use by using its wheels.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A cooking oven which comprises
a pair of opposing end walls,
a pair of opposing side walls containing radiating heating means, said side wall disposed inside of said end walls and defining, together with said end walls, a cooking chamber, said radiating heating means being surrounding by heat reflectors which are sloped to direct the heat toward the food being cooked,
a supporting frame adapted to support said end walls and said side walls,
opposing slider means mounted for movement on said supporting frame, said side walls being operatively mounted on said slider means, and
means for moving said slider means containing said side walls with said heating means mounted thereon towards or away from each other, whereby the size of the cooking chamber and the position of the heating means can be varied depending on the size of the food to be cooked.

2. The cooking oven of claim 1 wherein the slider means are provided with sockets and the side walls are provided with legs, said legs being mounted in said sockets for operatively mounting the side walls on the slider means.

3. The cooking oven of claim 1 wherein the means for moving the slider means comprises screw handles which extend across the supporting frame, said slider means being screw mounted on said screw handles whereby upon the rotation of the screw handles, the slider means containing the side walls can be moved in any desired direction.

4. The cooking oven of claim 1 wherein height adjustable rack supports are provided in the end walls and food support holders are slidably received by said rack supports.

5. The cooking oven of claim 4 wherein a cross hanger, upon which the food is mounted, is supported by the food support holders.

6. The cooking oven of claim 1 wherein the radiating heating means are infrared heaters.

7. The cooking oven of claim 6 wherein the heaters are covered by a wire net.

8. The cooking oven of claim 1 wherein the top portions of the side walls are folded inwardly toward the cooking chamber to reflect the heat inwardly toward the food being cooked.

9. The cooking oven of claim 8 wherein the top portions of the side walls are rotatable along the fold to provide ready access to the cooking chamber.

10. The cooking oven of claim 1 wherein the end walls are provided with legs and the supporting frame is provided with sockets for slidably receiving said legs.

11. The cooking oven of claim 1 wherein the food support holder contains a plurality of supports.

12. The cooking oven of claim 1 wherein the supporting frame is provided with wheels.

13. The cooking oven of claim 1 wherein the slider means is further supported by connecting rods which extend across the support frame, said slider means being slidably supported by said connecting rods.

* * * * *